United States Patent
Balmforth

(10) Patent No.: US 10,408,353 B2
(45) Date of Patent: Sep. 10, 2019

(54) ISOLATION VALVE ASSEMBLY

(71) Applicant: Bifold Fluidpower Limited, Manchester (GB)

(72) Inventor: Jonathan Edward Balmforth, Huddersfield (GB)

(73) Assignee: Bifold Fluidpower Limited, Manchester (GB)

(*) Notice: Subject to any disclaimer, the term of this patent is extended or adjusted under 35 U.S.C. 154(b) by 0 days.

(21) Appl. No.: 14/440,349

(22) PCT Filed: Nov. 1, 2013

(86) PCT No.: PCT/GB2013/052866
§ 371 (c)(1),
(2) Date: May 1, 2015

(87) PCT Pub. No.: WO2014/068330
PCT Pub. Date: May 8, 2014

(65) Prior Publication Data
US 2015/0276064 A1 Oct. 1, 2015

(30) Foreign Application Priority Data
Nov. 2, 2012 (GB) .................................. 1219770.3

(51) Int. Cl.
| F16K 1/30 | (2006.01) |
|---|---|
| F16K 24/02 | (2006.01) |
| F16K 27/02 | (2006.01) |

(52) U.S. Cl.
CPC .............. F16K 1/304 (2013.01); F16K 24/02 (2013.01); F16K 27/02 (2013.01); *Y10T 137/87917* (2015.04)

(58) Field of Classification Search
CPC .......... F16K 24/02; F16K 27/02; F16K 1/304; F16K 1/306; F16K 11/207; Y10T 137/87917; Y10T 137/87877
(Continued)

(56) References Cited

U.S. PATENT DOCUMENTS

| 3,583,441 A | 6/1971 | Grant |
| 4,570,677 A | 2/1986 | Roxton |

(Continued)

FOREIGN PATENT DOCUMENTS

| GB | 0761319 A | 11/1956 |
| GB | 847362 | 9/1960 |

(Continued)

OTHER PUBLICATIONS

Search Report from the Intellectual Property Office Great Britain for Application No. GB1219770.3 dated Feb. 11, 2013 (3 pages).
(Continued)

*Primary Examiner* — Michael R Reid
(74) *Attorney, Agent, or Firm* — Michael Best & Friedrich LLP

(57) ABSTRACT

An isolation valve assembly having a valve body (22) provided with an inlet (23) and an outlet (24), fluidly connected by a fluid passageway (25), and an isolation valve (26, 27) that is operable to selectively open or close the fluid passageway. A vent is fluidly connected to the fluid passageway and a vent valve (34) is operable to open and close fluid communication between the fluid passageway and the vent. The vent valve comprises a stem (36) with a sealing member (37) and is operable between an open position, in which the sealing member is disposed such that the fluid passageway and the vent are fluidly connected and a closed
(Continued)

position in which the valve stem extends across the fluid passageway and the sealing member seals the vent from the flow passageway.

21 Claims, 4 Drawing Sheets

(58) Field of Classification Search
USPC .................................................. 137/613, 883
See application file for complete search history.

(56) References Cited

U.S. PATENT DOCUMENTS

| | | |
|---|---|---|
| 4,616,677 A | 10/1986 | Krechel |
| 4,711,268 A | 12/1987 | Coleman |
| 7,647,944 B1 | 1/2010 | Howerton |
| 2003/0084942 A1* | 5/2003 | McHugh ............. F16K 11/0873 137/613 |
| 2013/0026399 A1* | 1/2013 | Paris ....................... F16K 24/04 251/118 |

FOREIGN PATENT DOCUMENTS

| | | |
|---|---|---|
| GB | 2048436 A | 12/1980 |
| GB | 2457473 A | 8/2009 |

OTHER PUBLICATIONS

International Search Report for International Application No. PCT/GB2013/052866 dated Nov. 1, 2013 (5 pages).

* cited by examiner

ISOLATION VALVE ASSEMBLY

CROSS-REFERENCE TO RELATED APPLICATIONS

This patent application is a national stage filing under 35 U.S.C. 371 of International Patent Application No. PCT/GB2013/052866, filed Nov. 1, 2013 which claims priority to United Kingdom Patent Application No. 1219770.3, filed Nov. 2, 2012, the entire contents of all of which are hereby incorporated by reference herein.

BACKGROUND

The present invention relates to an isolation valve assembly for connection between a main flow pipeline and at least one fluid sensor, gauge or the like. The invention is particularly, but not exclusively, concerned with a double block and bleed isolation valve.

It is often necessary to determine characteristics of fluid flow in a main flow pipeline, such as, for example fluid pressure or temperature. The traditional approach to sensing such parameters is to connect a sensor or gauge to a main flow pipeline via an isolation valve assembly. The valve assembly is used to isolate the sensor temporarily from the main flow pipeline in the event that the sensor needs servicing or replacing.

SUMMARY

With reference to FIGS. 1 and 2, a known isolation valve assembly 1 comprises a valve body 2 having an inlet 3 and an outlet 4 with a fluid passageway 11 extending between the inlet 3 and the outlet 4. The inlet 3 is for connection to a main flow pipeline (not shown) and the outlet 4 is for connection to a sensor or gauge (not shown). The assembly 1 comprises first and second isolation valves 5, 6 ("block" valves), disposed between the inlet 3 and outlet 4, which are manually operable to selectively open and close the fluid passageway 5. The assembly 1 also comprises a vent 9 disposed between the first and second isolation valves 5, 6.

The vent 9 is fluidly connected to the fluid passageway 11 by a connecting passageway 7. The connecting passageway 7 extends from a first end 8, which opens into of a side of the fluid passageway 11 that is opposite to the side of the fluid passageway 11 that is adjacent to the vent 9, to a second end 10 which opens into the vent 9. The connecting passageway 7 is routed through the valve body 2 and is angled around the fluid passageway 11 so as to bypass it.

The assembly 1 further comprises a vent valve 12 ("bleed" valve) operable to open or close fluid communication between the fluid passageway 11 and the vent 9. The vent valve 12 is received in a cavity 13, provided on an opposite side of the fluid passageway 11 to the vent 9. The vent valve 12 is a needle valve having a stem 15 with a sealing ball 14 which can selectively open and close the connecting passageway 7.

In normal use, the first and second valves 5, 6 are open and the vent valve 12 is closed, so that the fluid pressure from the main flow pipeline (not shown) is directed through the valve assembly 1 to the gauge/sensor (not shown).

In order to isolate the gauge/sensor from the main flow, the first isolation valve 5, which is the upstream valve (closest to the main flow pipeline), is closed and the second isolation valve 6, which is the downstream valve (closest to the sensor) is open. The vent valve 12 is then opened, to allow any fluid downstream of the first isolation valve 5 to be drained off through the vent 9. The sensor/gauge can then be removed from the inlet 3 to the assembly 1, for repair or replacement.

A problem with such an isolation valve assembly is that the connecting passageway 7 requires complex and expensive angled drilling through the valve assembly.

In addition, the fluid flow through the fluid passageway 11 acts on the underside of the needle valve sealing ball 14, thus applying a force in the direction against the sealing.

It is an object of the present invention, amongst others, to obviate or mitigate the aforesaid disadvantages and/or to provide for an alternative or improved isolation valve assembly.

According to the present invention there is provided an isolation valve assembly comprising a valve body having an inlet and an outlet fluidly connected by a fluid passageway, at one least isolation valve operable to selectively open or close the fluid passageway, a vent fluidly connected to the fluid passageway and a vent valve operable to open and close fluid communication between the fluid passageway and the vent, the vent valve comprising a stem with a sealing member, wherein the vent valve is operable between an open position in which the sealing member is disposed such that the fluid passageway and the vent are fluidly connected and a closed position in which the valve stem extends across the fluid passageway and the sealing member seals the vent from the flow passageway.

Since, in the closed position, the valve stem extends across the fluid passageway, this allows for a direct connection between the fluid passageway and the vent, i.e. without requiring a connection between the fluid passageway and the vent that is routed through the valve body and angled around the fluid passageway so as to bypass the passageway. Accordingly, the assembly is easier, cheaper and faster to manufacture than current isolation valve assemblies. In addition, the assembly is more compact than current isolation valve assemblies.

Preferably, in the closed position, the valve stem extends across the width of the fluid passageway. Preferably the fluid passageway has a substantially circular cross sectional shape. In this case, in the closed position the valve stem preferably extends across the diameter of the fluid passageway.

Preferably the vent is fluidly connected to a side of the fluid passageway that is proximal to the vent. Preferably the vent is fluidly connected to the fluid passageway by a connecting passageway which opens into the fluid passageway. Preferably the connecting passageway opens into a side of the fluid passageway that is proximal to the vent.

Preferably the connecting passageway has a longitudinal axis which is substantially straight. Preferably the fluid passageway has a longitudinal axis and the longitudinal axis of the connecting passageway is substantially perpendicular to the longitudinal axis of the fluid passageway.

Preferably in the closed position the sealing member closes the end of the connecting passageway that opens into the fluid passageway.

Preferably the stem of the vent valve and the fluid passageway are arranged such that when the vent valve is in the closed position there is a clearance between the stem and an inner wall of the fluid passageway so as to allow fluid flowing in the fluid passageway to flow past the stem. Preferably the clearance is a radial clearance.

This is advantageous in that, when the vent valve is in the closed position, fluid can flow from the inlet to the outlet of the assembly. Accordingly, when the vent valve is closed, and the at least one isolation valve is open, the fluid pressure from the main flow pipeline may be directed through the valve assembly to a gauge/sensor connected to the valve assembly.

Preferably the stem has a curved outer surface. Preferably the stem is substantially cylindrical. This is advantageous in that it reduces the effect of the stem on fluid flowing past the stem.

Preferably the vent valve is received in a cavity that extends into the valve body and opens into the fluid passageway. Preferably the cavity is dimensioned to allow the stem and sealing member of the vent valve to pass into the fluid passageway to the closed position.

Preferably the connecting passageway opens into a side of the fluid passageway that is opposite to the side of the fluid passageway which the cavity opens into. Preferably the cavity and the connecting passageway are diametrically opposed about the longitudinal axis of the fluid passageway.

Preferably the vent comprises an aperture in an outer wall of the valve body.

Preferably a central axis of the vent is substantially in line with the longitudinal axis of the connecting passageway.

Preferably the vent valve and the vent are provided on opposed sides of the fluid passageway. Preferably the vent valve and the vent are diametrically opposed about the longitudinal axis of the fluid passageway.

Preferably the sealing member of the vent valve is a ball, or a section of a ball, provided at a first end of the stem. Preferably the vent valve comprises a housing with an axially extending bore, within which the stem is received, the bore is provided with an internal threaded section and the stem is provided with an external threaded section which is engageable with the internal threaded section of the bore such that as the stem rotates relative to the housing, it translates relative to the housing. The housing may be received, at least partially, within the cavity.

Preferably the length of the internal threaded section of the bore, the length of the external threaded section of the stem and the diameter of the fluid passageway are arranged such that the stem can be screwed from the open position to the closed position.

This is advantageous in that it allows the valve assembly to be used with a conventional needle valve. Specifically, a valve body of smaller diameter than a conventional valve body (as shown in FIGS. 1 and 2) can be used to allow a conventional needle valve to occupy both the open and closed positions. If the valve body was of the conventional size (as shown in FIG. 1), which is of a larger diameter, then the stem of a conventional needle valve would be too short extend across the diameter of the fluid passageway so as to occupy the closed position.

Preferably the sealing member is arranged such that, in the closed position, fluid flowing in the fluid passageway produces a force on the sealing member in the direction of its sealing. Preferably the sealing member is arranged such that, in the closed position, fluid flowing in the fluid passageway passes over the sealing member. This is advantageous in that the flowing fluid aids the sealing action of the sealing member.

Preferably in the closed position a surface of the vent valve is exposed to fluid flowing in the fluid channel and a lower surface of the sealing member is disposed within the connecting passageway such that it is shielded from the flow within the fluid passageway.

Preferably a handle is provided towards a second end of the stem, operable to manually rotate the stem relative to the housing.

Preferably the vent valve is a needle valve.

Preferably the inlet is for connection to a main flow pipeline and the outlet is for connection to instrumentation. The instrumentation may comprise a sensor, gauge or the like, for example a pressure sensor or temperature sensor.

Preferably the at least one isolation valve is a ball valve. The ball valve is rotatably mounted and has a bore therethrough for selective alignment with the fluid passageway.

Preferably the at least one isolation valve comprises first and second isolation valves and the vent valve is disposed between the first and second isolation valves.

All of the features described herein may be combined with any of the above aspects, in any combination.

BRIEF DESCRIPTION OF THE DRAWINGS

For a better understanding of the invention, and to show how embodiments of the same may be carried into effect, reference will now be made, by way of example, to the accompanying diagrammatic drawings in which.

DETAILED DESCRIPTION

Figure 1:
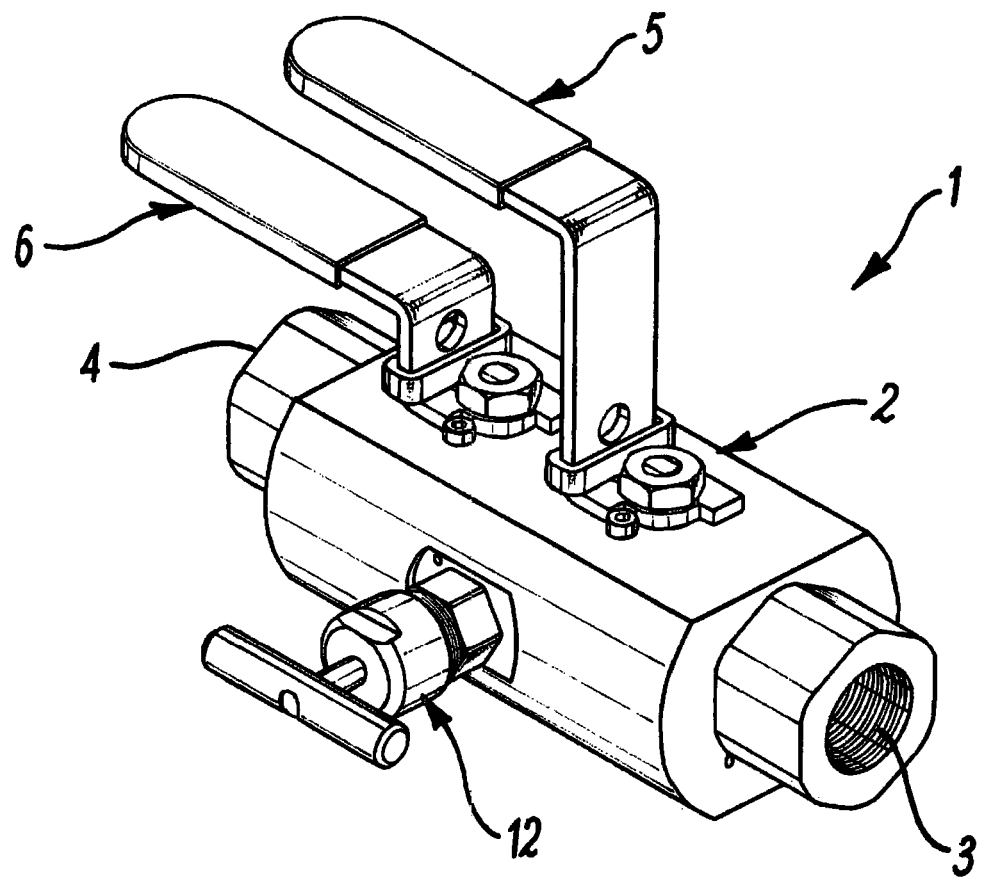
FIG. 1 shows a perspective view of a known isolation valve assembly.

Referring to FIGS. 3 to 6 there is shown an isolation valve assembly 21 in accordance with the present invention.

The isolation valve assembly 21 comprises a valve body 22 having an inlet 23 and an outlet 24 with a fluid passageway 25 fluidly connecting the inlet 23 and the outlet 24. The valve body 22 is generally elongate and has a generally hexagonal cross sectional shape. The fluid passageway 25 is substantially cylindrical and extends along the longitudinal axis of the valve body 25, with the inlet 23 and outlet 24 provided at opposed ends of the valve body 22. The inlet 23 is for connection to a main flow pipeline (not shown) and the outlet 24 is for connection to instrumentation in the form of a sensor or gauge (not shown).

The assembly 21 comprises first and second isolation valves in the form of first and second ball valves 26, 27 disposed in the fluid passageway 25 between the inlet 23 and outlet 24. The first ball valve 26 is the upstream valve (closest to the main flow pipeline) and is disposed inwardly adjacent to the inlet 23. The second ball valve 27 is the downstream valve (closest to the sensor/gauge) and is disposed inwardly adjacent to the outlet 24. The first and second ball valves 26, 27 are manually operable by rotation to selectively open and close the fluid passageway 25 by bringing respective bores through the valves into selective alignment with the fluid passageway 25. The first and second ball valves 26, 27 are operable by respective handles 28, 29.

The assembly 1 further comprises a vent valve in the form of a needle valve 34. The needle valve 34 is received in a cavity 35 disposed between the first and second ball valves 26, 27. The cavity 35 extends inwardly from an outer surface of the valve body 22 and is substantially cylindrical, having a longitudinal axis that is generally perpendicular to the longitudinal axis of the fluid passageway 25. The cavity 35 extends through the valve body 22 and opens into the fluid passageway 25. Accordingly, the cavity 35 and the fluid passageway 25 have a shared portion.

The needle valve 34 comprises a housing 40 provided with an axially extending bore 41 that extends throughout the length of the housing 40. An elongate stem 36 of the needle valve 34 passes through the bore 41. A first end of the stem 36 protrudes from an upper surface of the housing 40 and is provided with a handle 42 which extends generally perpendicularly to the longitudinal axis stem 36. A second end of the stem 36 is provided with a sealing member in the form of a sealing ball 37.

The bore 41 is provided with an internal threaded section (not shown) and the stem 36 is provided with an external threaded section (not shown) which is engageable with the internal threaded section of the bore 41 such that rotation of the stem 36 relative to the housing 40 causes the stem 36 to translate relative to the housing 40 between an open position and an closed position (see below). The stem 36 is manually rotatable, relative to the housing 40, by the handle 42.

The assembly 21 also comprises a vent 30 disposed between the first and second ball valves 26, 27. The vent 30 extends inwardly from an aperture 38 formed in an outer surface of the valve body that is opposite to the outer surface of the valve body that is provided with the cavity 35. The vent 30 comprises a substantially cylindrical bore having a longitudinal axis that is generally perpendicular to the longitudinal axis of the fluid passageway 25.

The vent 30 and needle valve 34 are diametrically opposed relative to the fluid passage 25 and their respective longitudinal axes are substantially aligned.

The inner end of the vent 30 is fluidly connected to the fluid passageway 25 by a connecting passageway 31. The connecting passageway 31 extends from a first end 32, which opens into a side of the fluid passageway 25 that is proximal to the vent 30, to a second end 33 which opens into the vent 30. The first end 32 of the connecting passageway 31 is diametrically opposed to the cavity 35 in which the needle valve 34 is housed. The bore of the vent 30 is of greater diameter than the connecting passageway 31.

The connecting passageway 31 is substantially cylindrical and has a longitudinal axis which is substantially perpendicular to the longitudinal axis of the fluid passageway 25 and substantially in line with the respective longitudinal axes of the cavity 35 and vent 30. The connecting passageway 31 is substantially straight. Specifically, the longitudinal axis of the connecting passageway 31 is substantially straight.

The needle valve 34 is operable between an open position (shown in FIG. 6) and a closed position by rotation of the handle 42, which rotates the stem 36 relative to the housing 40, causing the stem 36 to translate relative to the housing towards the second end 33 of the connecting passageway 31, as described above. In the open position, the sealing ball 37 is spaced from the first end 32 of the connecting passageway 31, thereby allowing fluid communication between the vent 30 and the fluid passageway 25. In the closed position the valve stem 36 extends across the diameter of the fluid passageway 25 and the sealing ball 37 is partially received within the first end 32 of the connecting passageway 31 so as to close said first end 32. In this position the sealing ball 37 seals the vent 30 from the fluid passageway 25. In the closed position the longitudinal axis of the stem 36 is substantially perpendicular to the longitudinal axis of the fluid passageway 25.

The cavity 35 is dimensioned to allow the stem 36 and sealing ball 37 of the needle valve 34 to pass into the shared portion of the fluid passageway 25 and the cavity 36, as the needle valve 34 moves from the open position to the closed position.

Since, in the closed position, the valve stem 36 extends across the diameter of the fluid passageway 25, this allows the first end 32 (i.e. the inlet) of the connecting passageway 31 to open into a side of the fluid passageway 25 (the shared portion of the fluid passageway 25 and the cavity 35) that is proximal to the vent 30. Accordingly, this allows for a direct, substantially straight, connection between the fluid passageway 25 and the vent 30, i.e. without requiring a connection between the fluid passageway 25 and the vent 30 that is routed through the valve body 22 and angled around the fluid passageway 25 so as to bypass the passageway 25. Accordingly, the assembly 21 is cheaper, easier and faster to manufacture than current isolation valve assemblies. In addition, the assembly 21 is more compact than current isolation valve assemblies.

In the closed position, the fluid flowing through the fluid passageway 25 passes over the sealing ball 37, thus applying a force in the direction of the sealing. Furthermore, a lower surface of the sealing ball 37 is disposed within the connecting passageway 31 such that it is shielded from the flow within the fluid passageway 25. This is advantageous in that the pressure of the flowing fluid aids the sealing action of the sealing ball 37.

The length of the internal threaded section of the bore 41 and of the external threaded section of the stem 36 of the needle valve 34 and the diameter of the fluid passageway 25 are sized and dimensioned such that the stem 36 can be screwed from the open position to the closed position.

Figure 2:
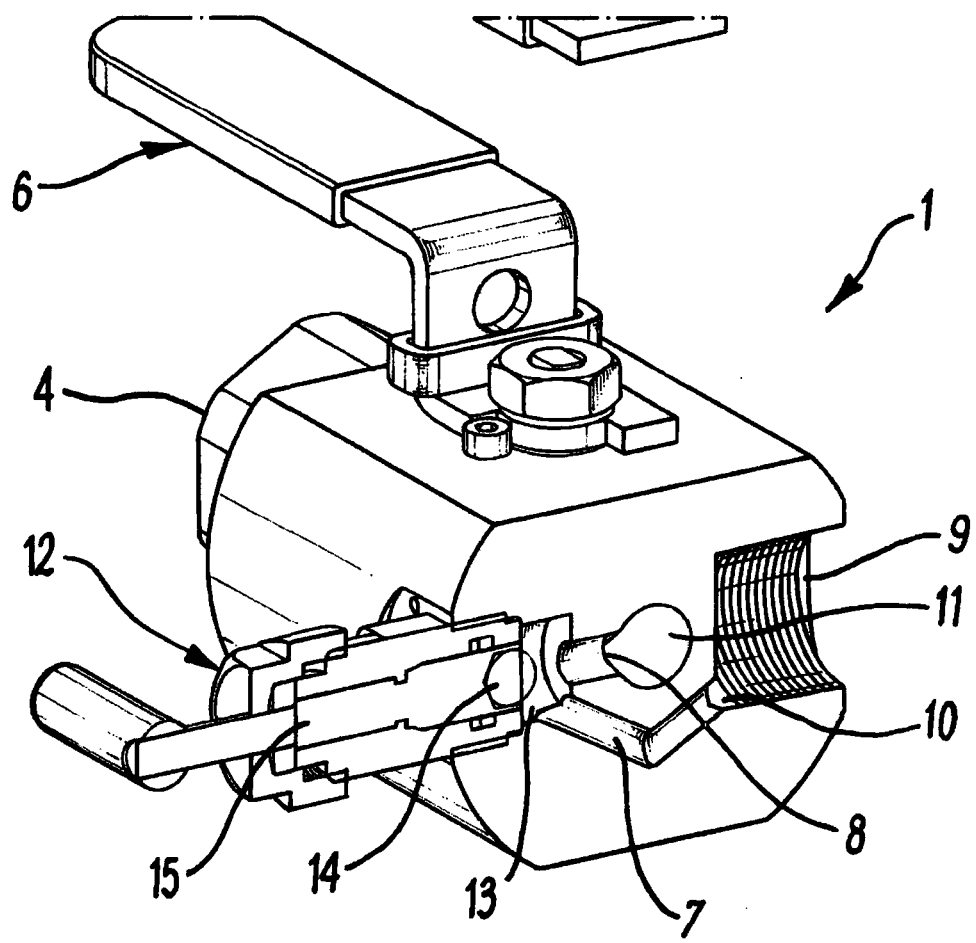
FIG. 2 shows a horizontal cross-sectional view of the known isolation valve assembly shown in FIG. 1.
Figure 3:
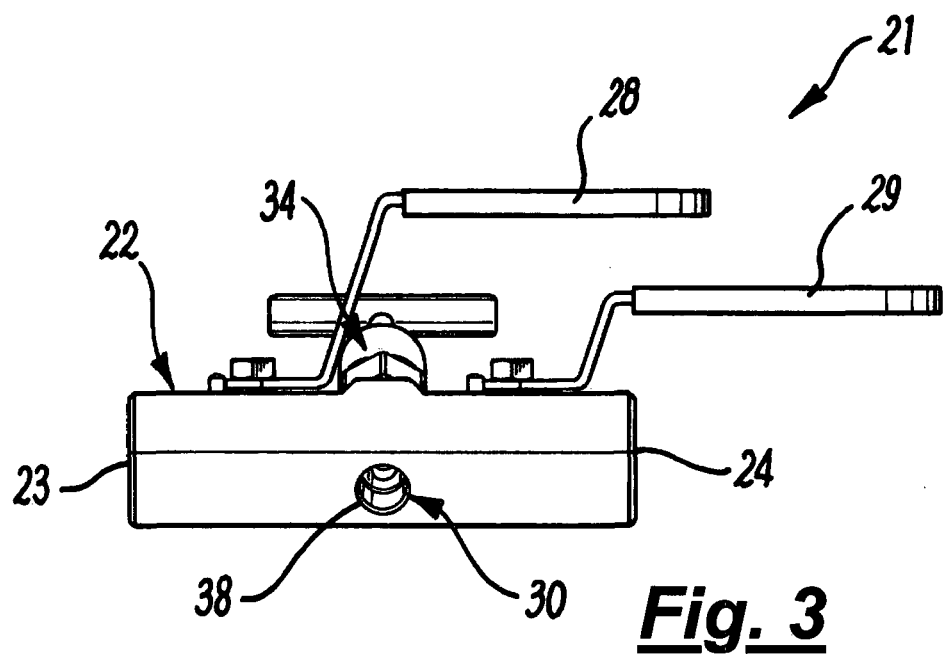
FIG. 3 shows a front elevational view of an isolation valve assembly in accordance with the present invention.
Figure 4:
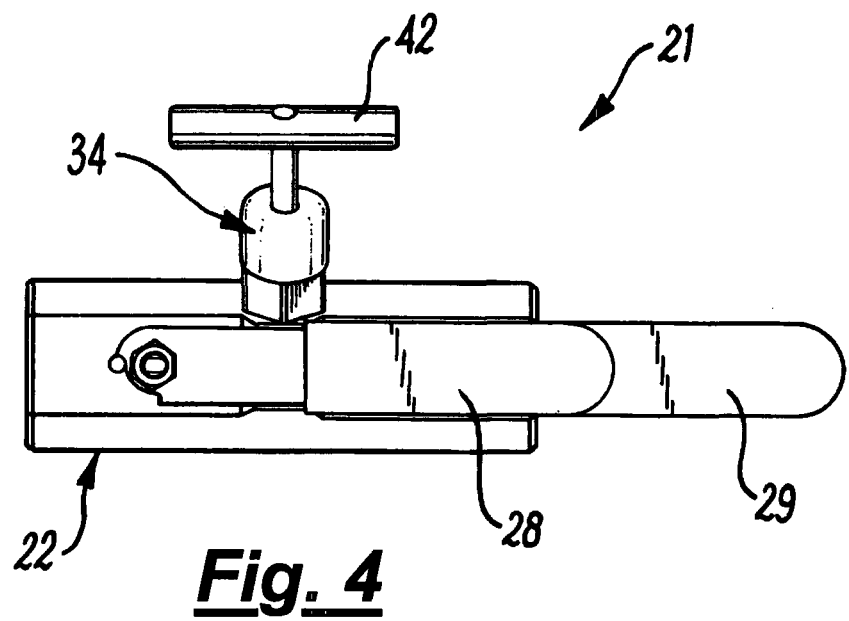
FIG. 4 shows a plan elevational view of the isolation valve assembly of FIG. 3.
Figure 5:
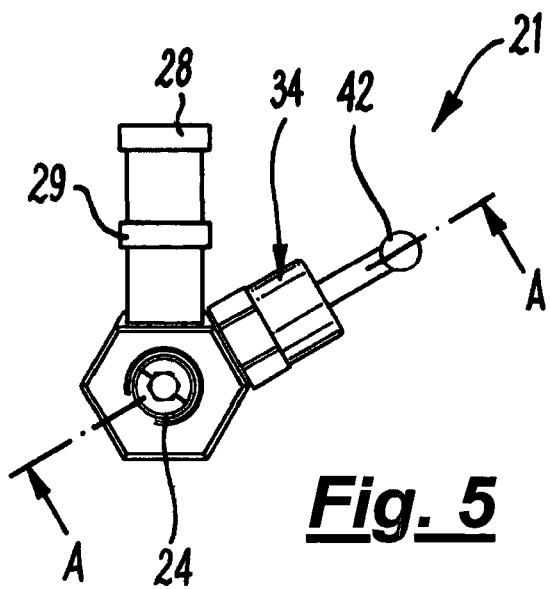
FIG. 5 shows a side elevational view of the isolation valve assembly of FIGS. 3 and 4.
Figure 6:
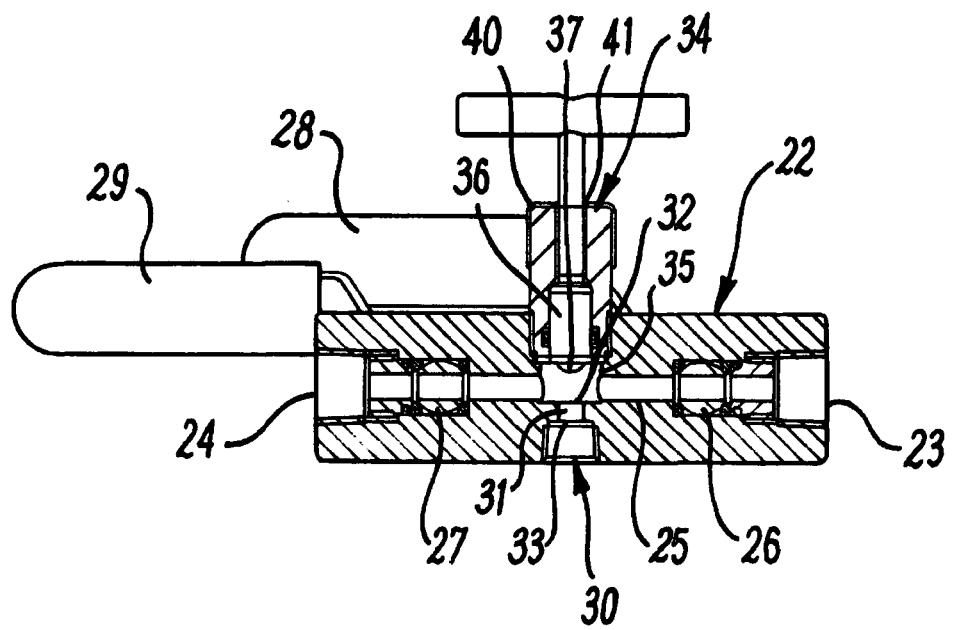
FIG. 6 shows a cross-sectional view of the isolation valve assembly of FIG. 5, taken along the line A-A.

This is advantageous in that it allows a conventional needle valve 34 to be used as part of the valve assembly 21. Specifically, a valve body 22 of smaller diameter than a conventional valve body (as shown in FIGS. 1 and 2) can be used to allow a conventional needle valve to occupy both the open and closed positions. If the valve body 22 was of the conventional size shown in FIG. 1, which is of a larger diameter, then the stem of a conventional needle valve would be too short extend across the diameter of the fluid passageway 25 so as to occupy the closed position.

The stem 36 of the vent valve and the fluid passageway 25 are arranged such that when the needle valve 34 is in the closed position there is a radial clearance between the stem 36 and the fluid passageway 25 so as to allow fluid to flow through the fluid passageway 25, around the stem 36.

This is advantageous in that, when the needle valve 34 is in the closed position, fluid can flow from the inlet 23 to the outlet 24 of the assembly 21. Accordingly, when the needle valve 34 is closed, and the first ball valve 26 is open, the fluid pressure from the main flow pipeline may be directed through the valve assembly 21 to the gauge/sensor connected to the valve assembly 21.

In normal use, the first and second ball valves 26, 27 are open and the needle valve 34 is closed, so that the fluid pressure from the main flow pipeline is directed through the valve assembly 21 to the gauge/sensor.

In order to isolate the gauge/sensor from the main flow, the first ball valve 26 is closed and the second ball valve 27 is open. The vent valve 34 is then opened, to allow any fluid downstream of the first isolation valve 26 to be drained off through the vent 30. The sensor/gauge can then be removed from the inlet 23 to the assembly 21, for repair or replacement.

In light of the above, it can be seen that the isolation valve assembly 21 of the present invention is cheaper, easier and faster to manufacture than current isolation valve assemblies and is more compact. In addition, in use, the flowing fluid aids the sealing action of the needle valve 34. Furthermore, the valve assembly 21 is suitable for use with conventional needle valves.

The above embodiment is described by way of example. Many variations are possible without departing from the invention, as defined by the appended claims.

For example, although in the described embodiment the isolation valve comprises two isolation valves 26, 27, in the manner of a double block and bleed arrangement, it will be appreciated that alternatively, the isolation valve could comprises a single ball valve arrangement in a single block and bleed configuration.

Furthermore, although the isolation valves in the described embodiment are ball valves, it will be appreciated that any suitable type of isolation valve may be used.

Similarly, although the vent valve in the described embodiment is a needle valve, it will be appreciated that any suitable type of vent valve may be used.

The invention claimed is:

1. A double-block-and-bleed valve assembly for connection between a main flow pipeline and instrumentation, the double-block-and-bleed valve assembly comprising:
   a valve body having an inlet and an outlet fluidly connected by a fluid passageway, the inlet configured to be connected to a main flow pipeline, and the outlet configured to be connected to the instrumentation, the fluid passageway having a substantially cylindrical shape along a majority of a distance between the inlet and the outlet, the valve body having a hexagonal cross-sectional shape,
   first and second isolation valves operable to selectively open or close the fluid passageway,
   first and second handles mounted on a first external surface of the valve body, the first handle is configured to operate the first isolation valve and the second handle is configured to operate the second isolation valve,
   a vent fluidly connected to the fluid passageway and a vent valve operable to open and close fluid communication between the fluid passageway and the vent,
   the vent valve comprising a stem with a sealing member, and the vent valve comprising a housing mounted on a second external face of the valve body, the second external face being adjacent the first external face, wherein the vent valve is operable between an open position in which the sealing member is disposed such that the fluid passageway and the vent are fluidly connected and a closed position in which the valve stem extends across the fluid passageway and the sealing member seals the vent from the fluid passageway;
   wherein the vent valve is disposed between the first and second isolation valves; and
   wherein the sealing member is arranged such that, in the closed position, fluid flowing in the fluid passageway produces a force directly on the sealing member in the direction of its sealing.

2. A double-block-and-bleed valve assembly according to claim 1 wherein, in the closed position, the valve stem extends across the width of the fluid passageway.

3. A double-block-and-bleed valve assembly according to claim 1 wherein the vent is fluidly connected to a side of the fluid passageway that is proximal to the vent.

4. A double-block-and-bleed valve assembly according to claim 1 wherein the vent is fluidly connected to the fluid passageway by a connecting passageway which opens into the fluid passageway.

5. A double-block-and-bleed valve assembly according to claim 4 wherein the connecting passageway opens into a side of the fluid passageway that is proximal to the vent.

6. A double-block-and-bleed valve assembly according to claim 4 wherein the connecting passageway has a longitudinal axis which is substantially straight.

7. A double-block-and-bleed valve assembly according to claim 6 wherein the fluid passageway has a longitudinal axis and the longitudinal axis of the connecting passageway is substantially perpendicular to the longitudinal axis of the fluid passageway.

8. A double-block-and-bleed valve assembly according to claim 4 wherein in the closed position the sealing member closes the end of the connecting passageway that opens into the fluid passageway.

9. A double-block-and-bleed valve assembly according to claim 1 wherein the stem of the vent valve and the fluid passageway are arranged such that when the vent valve is in the closed position there is a clearance between the stem and an inner wall of the fluid passageway so as to allow fluid flowing in the fluid passageway to flow past the stem.

10. A double-block-and-bleed valve assembly according to claim 9 wherein the stem has a curved outer surface.

11. A double-block-and-bleed valve assembly according to claim 1 wherein the vent valve is received in a cavity that extends into the valve body and opens into the fluid passageway.

12. A double-block-and-bleed valve assembly according to claim 11 wherein the cavity is dimensioned to allow the stem and sealing member of the vent valve to pass into the fluid passageway to the closed position.

13. A double-block-and-bleed valve assembly according to claim 11 wherein the fluid vent is fluidly connected to the fluid passageway by a connecting passageway which opens into the fluid passageway and the connecting passageway opens into a side of the fluid passageway that is opposite to the side of the fluid passageway which the cavity opens into.

14. A double-block-and-bleed valve assembly according to claim 1 wherein the vent valve comprises a housing with an axially extending bore, within which the stem is received, the bore is provided with an internal threaded section and the stem is provided with an external threaded section which is engageable with the internal threaded section of the bore such that as the stem rotates relative to the housing, it translates relative to the housing; and the length of the internal threaded section of the bore, the length of the external threaded section of the stem and the diameter of the fluid passageway are arranged such that the stem can be screwed from the open position to the closed position.

15. A double-block-and-bleed valve assembly according to claim 1 wherein the sealing member is arranged such that, in the closed position, fluid flowing in the fluid passageway passes over the sealing member.

16. A double-block-and-bleed valve assembly according to claim 1 wherein in the closed position a surface of the vent valve is exposed to fluid flowing in the fluid channel and a lower surface of the sealing member is disposed within the connecting passageway such that it is shielded from the flow within the fluid passageway.

17. A double-block-and-bleed valve assembly according to claim 1 wherein at least one of the first and second isolation valves is a ball valve.

18. A double-block-and-bleed valve assembly according to claim 1 wherein the first and second isolation valves are ball valves.

19. A double-block-and-bleed valve assembly according to claim 1, wherein the instrumentation is at least one of a sensor or a gauge.

20. A double-block-and-bleed valve assembly according to claim 1
- wherein a terminal end of the inlet configured to be connected to the main flow pipeline, and a terminal end of the outlet configured to be connected to the instrumentation, the fluid passageway is cylindrical from the terminal end of the inlet to the terminal end of the outlet.

21. A double-block-and-bleed valve assembly of claim 1
- wherein the first and second isolation valves are first and second ball valves operable to selectively open or close the fluid passageway, and
- wherein the sealing member of the vent valve has a curved outer surface.

\* \* \* \* \*